(12) United States Patent
Li et al.

(10) Patent No.: US 8,719,095 B2
(45) Date of Patent: May 6, 2014

(54) TARGETED ADVERTISING IN A PEER-TO-PEER NETWORK

(75) Inventors: Dekai Li, Lawrenceville, GA (US); Ashwin Kashyap, Mountain View, CA (US); Saurabh Mathur, Monmouth Junction, NJ (US); Mingquan Wu, Princeton Junction, NJ (US); Hang Liu, Yardley, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 100 days.

(21) Appl. No.: 13/386,914

(22) PCT Filed: Aug. 19, 2009

(86) PCT No.: PCT/US2009/004721
§ 371 (c)(1),
(2), (4) Date: Jan. 25, 2012

(87) PCT Pub. No.: WO2011/021993
PCT Pub. Date: Feb. 24, 2011

(65) Prior Publication Data
US 2012/0123866 A1 May 17, 2012

(51) Int. Cl.
*G06Q 30/00* (2012.01)
(52) U.S. Cl.
USPC ..................................................... 705/14.55
(58) Field of Classification Search
USPC ..................................................... 705/14.55
See application file for complete search history.

(56) References Cited

U.S. PATENT DOCUMENTS

| 2004/0148424 | A1* | 7/2004 | Berkson et al. | 709/236 |
|---|---|---|---|---|
| 2005/0027821 | A1 | 2/2005 | Alexander et al. | |
| 2005/0108095 | A1* | 5/2005 | Perlmutter | 705/14 |
| 2005/0203849 | A1* | 9/2005 | Benson | 705/51 |
| 2007/0153703 | A1 | 7/2007 | Floyd | |
| 2008/0098420 | A1* | 4/2008 | Khivesara et al. | 725/32 |
| 2009/0193476 | A1* | 7/2009 | Straub et al. | 725/87 |
| 2009/0300673 | A1* | 12/2009 | Bachet et al. | 725/31 |

FOREIGN PATENT DOCUMENTS

| JP | 200363359 | 9/2003 |
|---|---|---|
| JP | 2003323142 | 11/2003 |
| JP | 2005258989 | 9/2005 |

(Continued)

OTHER PUBLICATIONS

International Search Report dated May 26, 2010 for PCT/US2009/004721.

*Primary Examiner* — Leland Marcus
(74) *Attorney, Agent, or Firm* — Robert D. Shedd; Jerome G. Schaefer (57) ABSTRACT

A method is described including requesting content from a directory service, receiving a list of peers in a peer-to-peer network having the requested content, selecting a peer from the received list of peers, establishing communications with the selected peer, receiving a list of chunks of content and ads available from the selected peer, requesting a chunk of content and ads available from said selected peer and receiving the chunk of content and randomly selected ads from the selected peer. Also described is a method including receiving a request for content, generating a list of chunks of content available for the requested content, generating a list of ads associated with the requested content, transmitting the list of available chunks of content responsive to the request, receiving a request for a selected chunk of content and transmitting the selected chunk of content and ads associated with the selected chunk of content.

8 Claims, 6 Drawing Sheets

(56) References Cited

FOREIGN PATENT DOCUMENTS

| | | |
|---|---|---|
| JP | 2005285265 | 10/2005 |
| JP | 2009527148 | 7/2009 |
| WO | WO2004075076 A1 | 9/2004 |
| WO | WO2007095309 A2 | 8/2007 |
| WO | WO2007131526 | 11/2007 |

* cited by examiner

TARGETED ADVERTISING IN A PEER-TO-PEER NETWORK

This application claims the benefit, under 35 U.S.C. §365 of International Application PCT/US09/004721, filed 19 Aug. 2009, which was published in accordance with PCT Article 21(2) on 24 Feb 2011 in English.

FIELD OF THE INVENTION

The present invention relates to targeted advertising in the context of peer-to-peer networks and, in particular, targeting advertising without violating peer privacy.

BACKGROUND OF THE INVENTION

Advertising is everywhere. It is broadcast over television and radio. It is on the Internet in the form of banners and other ads. It can surely also be used when downloading content via peer-to-peer networks. Advertising works best when it is targeted. Clearly, the ads broadcast during sporting events are targeted to the people that the companies choosing to advertise their products at that time believe will buy their product.

Targeted advertising is more effective in delivering the right commercial information to the right audience than blindly delivering information. However, in achieving effective targeted advertising, certain user information must be collected before an advertisement (ad) can be targeted toward this user. This usually violates the privacy of this user.

During the last decade, more and more content has been delivered over peer-to-peer networks. The content includes document data files, audio (including music, speech), video including movies, slide shows, collections of pictures (still images) multimedia including real-time media etc. One successful example is video distribution using peer-to-peer network, either as a video on demand (VoD) service or as live streaming. Because of the global reach of the Internet and the relatively low cost of data distribution, it is foreseeable that there is a good opportunity for targeted advertising in the peer-to-peer environment.

However, there are some requirements that must be satisfied before targeted commercials (advertising) can be deployed in a global peer-to-peer environment. First, users' privacy must be preserved to comply with laws and regulations of different regions and countries in the world. Second, advertising must be distributed efficiently. Servers should be involved as little as possible to allow scalability and advertising should have the same level of availability as the related content so that lookup complexity remains the same. Third, up-to-date advertising must be flexibly combined with related content. Finally, it must be possible to choose the right advertising for the right audience.

Conventionally, targeted advertising requires that the advertisement server knows some information about the user. One example is inserting advertising in the search results from an online (Internet) search, because the server knows for what the user is looking. But keeping the users' searching history on the advertisement server violates users' privacy. Another approach is to integrate advertisement into the content itself based not on users but on the characteristics of the content. Conventional advertising supported by broadcast TV is one such example. But this approach is not flexible in delivering dynamic, targeted, up-to-date advertisement.

What is needed is flexible, efficient, targeted advertising in a peer-to-peer environment without violating users' privacy.

SUMMARY OF THE INVENTION

Advertising should be distributed efficiently without incurring much overhead over the overhead incurred in the original peer-to-peer content distribution. Peers should also be able to locate and get advertising as quickly as getting the requested (desired) content. Advertising should have the same availability as the requested content. Moreover, scalability should not be sacrificed.

Any servers should not know more information than needed to provide a service. For example, the content server should not collect the peer's private information. Peers cannot know other peers' private information either.

It should be possible to dynamically assemble advertising and content so that up-to-date advertising (ads) can be used with existing or new content and different ads can be distributed for different users. This is a major difference from embedding ads in content, e.g. TV show.

Ads should be played to the right audience, i.e. people who are interested in them. Therefore, the number of played ads can be reduced to minimize the interruption of regular content rendering and improve the effectiveness of the advertising.

To that end the present invention offers flexible, efficient, targeted advising over peer-to-peer networks without violating users' privacy.

A method is described including requesting content from a directory service, receiving a list of peers in a peer-to-peer network having the requested content, selecting a peer from the received list of peers, establishing communications with the selected peer, receiving a list of chunks of content and ads available from the selected peer, requesting a chunk of content and ads available from said selected peer and receiving the chunk of content and randomly selected ads from the selected peer. Also described is a method including receiving a request for content, generating a list of chunks of content available for the requested content, generating a list of ads associated with the requested content, transmitting the list of available chunks of content responsive to the request for the content, receiving a request for a selected chunk of the content and transmitting the selected chunk of the content and ads associated with the selected chunk of the content.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The present invention divulges only minimal information between two communicating sides for the peer-to-peer system to work. But the peers do not know all the information there is to know about each other. Ads and related content are associated with each other and distributed together so that they have the same availability and lookup overhead is almost zero for the ads. An update mechanism is used to replace old ads with the latest ads. Keywords are tagged to make the ads targetable to a local peer.

Figure 1A:
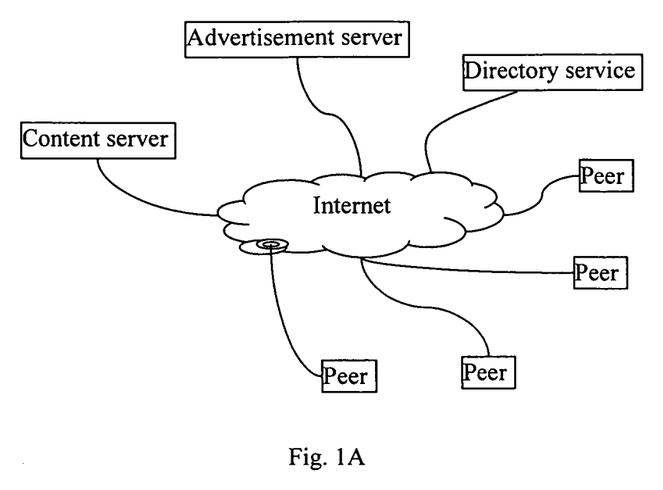
FIG. 1A shows an example peer-to-peer system with a content server, advertisement server, directory service, and four peers.

Specifically, when a peer requests content, a list of only randomly chosen peers who might have this content are returned. The servers (content and advertising) do not know what ads these peers might have. Upon receiving a request for content, a serving peer not only generates a selected list of available chunks, but also randomly generates a list of ads associated with the requested content, so that other peers do not know all the ads that the serving peer has. After a requesting peer watches content, a ranked list of ads is randomly generated based on the local playback history. This is so that no other peers know this peer's watching preferences. Moreover, the existence of peers which only cache certain content makes it hard for a peer to know whether another peer watched requested content or not and which ads were displayed for that particular content. FIG. 1A shows a deployment scenario of the peer-to-peer content distribution system. The present invention is directed to targeted advertising over P2P networks and the present invention operates in any P2P environment. A content server is used to serve content. An advertising server is used to serve advertisements. A directory service is used to respond to content requests by providing a list of peers which might have the requested content. A peer is a user side device. It might be a computer, entertainment device, home gateway, set top box, or a storage device. It can cache content for other peers. Optionally, it can also render some locally cached content. Peers periodically check the content server for content that needs to be distributed. If a peer has enough resources, e.g. network bandwidth, local storage, it actively participates in content distribution by caching content for other peers.

Although content servers, advertisement servers, and a directory service are logically separate, it is possible that in certain deployment, these servers might be co-located either on separate or the same machine.

Being efficient in distributing ads in a content network is very important. In a peer-to-peer environment, this becomes even more important because ads are themselves short units (pieces) of content and thus the total amount of content increases with ads. Searching and downloading ads requires a great deal of system resources. For example, time must be expended looking for ads in the peer-to-peer network and finding the best peers from which to download the ads. These are all costs in addition to the normal content distribution costs.

In the present invention, ads are associated with their related content. When content is distributed to a peer, associated ads are also distributed to the peer. It is possible that the number of the peer's associated ads is very large. In this case, a subset of ads is selected to distribute to the peer. The subset of ads can be chosen either randomly or based on a hash function that takes into account previous ad subset decisions, so that when the number of peers increases, all the ads will be distributed.

For each machine (including servers and peers) that distributes ads, a mechanism is used to keep a distribution count for each ad. When an ad is downloaded by a peer, the distribution count is incremented. When it is desirable or necessary to select a subset of ads, a higher probability is given to those ads with lower distribution count values, e.g. those newly added ads. The subset is selected using the following equation:

$$ads = \bigcup_{i=1}^{N} \left\{ AD_i \mid P_i = \frac{C_{max} - C_i + c}{\sum_{j=1}^{N}(C_{max} - C_j + c)} \right\}$$

where N is the total number of ads associated with a unit of content. $C_i$ is the distribution count of $ad_i$. $C_{max}$ is the maximum distribution count among all the ads. $P_i$ is the probability that $ad_i$ will be selected in this subset. c is a constant that ensures that the ad with distribution count of $C_{max}$ does not get 0 probability.

Another approach is to use the sum of distribution count for all ads.

$$ads = \bigcup_{i=1}^{N} \left\{ AD_i \mid P_i = \frac{C_{sum} - C_i}{C_{sum}} \right\}$$

where $$C_{sum} = \sum_{j=1}^{N} C_j$$

It is also possible to give a different priority to different ads according to certain criteria. For example, ads with more profit may be given a higher priority by increasing the distribution count not by one, but by ½. Moreover, a geography-based or network latency-based algorithm can be used to distribute content and ads, so that peers can find content and ads locally (either geographically or with respect to network delay).

The method of the present invention has several advantages. Because ads are piggybacked onto their associated content, no additional lookup is necessary for ads when searching for a unit of content. The availability of ads is guaranteed with the availability of the searched content. When choosing peers for downloading content, those that serve the content well will also serve ads well. Moreover, ads are usually very small compared with normal content and thus storage and bandwidth consumption is marginal. Therefore, scalability remains the same as a conventional peer-to-peer system.

Although content chunks (units of content) and related ads are associated with each other, they are randomly distributed to each peer. Different subsets of chunks are cached on each peer and peers do not need to have all the ads. Only when a peer wants to watch a unit of content, is it necessary to collect all of its content chunks (including ads). Even in this case, no other peers/servers can tell whether this peer is watching this content or just caching the whole content.

When a peer actually watches a unit of content, its associated ads are randomly selected. They might be different ads or the same ads repeated. Even if a peer has cached a number of ads for this content, only a selected few are actually rendered. The selected subset also varies from peer to peer. So no peers/servers know the ads viewed on other peers.

The content server only knows which peers requested which content from it. The content server does not know any information about the communication among peers themselves. It does not know what ads are downloaded to a peer. Moreover, the content server cannot infer whether a peer actually viewed content or not because some peers might only cache content for other peers.

The advertisement server only knows which content is requested by a peer when the peer requests ads associated with the requested content. It may or may not know information about this content. For example, the association can be done by using a hash value as the content identifier to hide information about the content. The association can also be done by specifying some keywords for both the content and the related ads. Moreover, the advertisement server knows only the peers which request ads from it. Subsequent ad distribution is totally hidden from the advertisement server. More importantly, the advertisement server does not know whether content is actually viewed by a peer or not. Even if content is viewed, the advertisement server does not know which subset of ads will be viewed by a specific peer.

The directory service only keeps a mapping between content identifiers and peers who might have the content. It does not have any information about the content. It does not have any information about subsequent content distribution nor does it know any information about the related or associated ads. Similar to the other servers, the advertisement server does not know whether requested content is viewed or not and which subset of ads will be viewed if particular content is viewed.

After downloading chunks of content, a peer randomly reports to the directory service about its availability, so that other peer can get the downloaded content from this peer. But a peer never reports the availability of ads.

To protect the privacy of each peer, first the peer is designed to be able to cache content for other peers. Additionally, a peer might be able to render content locally. However, a peer cannot know whether another peer is only caching content (cache-only peer) or also able to view content (normal or regular peer). For normal peers, content cached for other peers is totally independent from content viewed locally. A normal peer might or might not view the cached content. If a normal peer does not view the cached content, this peer becomes a cache-only peer and just contributes to the content distribution network. The implication is that any data serving peer cannot know whether the data receiving peer will actually view the served content or not, protecting the privacy of the data receiving peer. The data serving peer only serves the requested content. A data receiving peer does not know all of the content stored on the data serving peer or whether the requested content has already been viewed by the data serving peer or not. When a peer requests content from another peer, randomly selected ads are fetched, so that the data receiving peer does not even know all of the ads associated with the requested content that are stored on the data serving peer. Thus, the data serving peer's privacy is also protected.

By employing a public key scheme, content can be encrypted during transmission, protecting against network spoofing or sniffing. In this way, no third party knows what content is exchanged between two peers.

Conventionally, ads can be integrated into the content. A recorded TV program with embedded ads is an example. This is not flexible in dynamically choosing ads for content downloaded using a peer-to-peer network. Moreover, in such an arrangement embedded ads have the same lifetime as their hosting content. Thus, when new ads are released, they cannot be associated with existing already served content (which may or may not have already been viewed). One of the design goals of the present invention is the flexibility of showing up-to-date ads with their associated content. So the challenge is to distribute up-do-date (current) ads to peers even when their associated content has already been distributed.

Compared to content, ads usually have a shorter lifetime. In order to get more advertisement delivered to peers, the present invention uses a replacement scheme that keeps the ads current. Each ad is associated with a timestamp and a time to live which are embedded in the ad. First, the advertisement server constantly keeps adding new advertisements associated with content. Old ads are deleted as they expire. When peers request this content, the advertisement server is used to serve newer ads. Second, when a peer requests specific (particular) content from a directory service and receives a list of peers having the requested content from the directory service, the peer checks the timestamp of the ads on the peers on the supplied list and prefers peers having the latest ads.

When a certain percentage of ads have expired, the peer (either a normal peer or a cache-only peer or both types of peers) can delete the expired ads and also get some up-to-date related ads at the same time. But there are some disadvantages. As a peer finishes downloading more (additional) content, the number of expiring ads also increases, resulting in more and more ads being downloaded. This increase in the number of ads downloaded competes with content being downloaded for shared network bandwidth. Moreover, the local storage requirement for ads will also increase with the increase in content.

It can be assumed that as content ages, the more likely the aged content will be deleted to make space for new content. When a certain percentage of ads has expired, some chunks of the associated content can also be deleted, so that this peer cannot be used to serve all the chunks of this content.

Let E be the current percentage of expired ads. Then it is desirable to also delete E percent of content chunks. A uniform distribution function can be used to give each chunk the same probability of deletion. For example, if the content has N chunks, NE random numbers can be generated in the range of [1,N] and these NE chunks of content can be deleted.

However, the chunks of the content have different importance. For example, the beginning chunks affect the playback startup delay while the ending chunks affect the availability of the content. Therefore, it is desirable to delete NE chunks, but a higher probability is given for deletion of chunks in the middle of given (particular) content. As an example, a simple probability function is used for chunk deletion based on the following equation:

$$P_i = \frac{E}{\alpha\left|i - \frac{N}{2}\right| + \beta}$$

where $P_i$ is the probability of i-th chunk being deleted, N is the number of chunks of this content, $\alpha$ and $\beta$ are constants that are configurable.

However, if all peers use the same probability function, then the chunks in the middle of the content will have low availability after some time. This has the advantage of synchronizing the chunk availability in the whole peer-to-peer system, so that when a peer requests this content, new ads will be injected quickly. But if there is a sudden flash crowd of peers requesting this content, the content server might become overloaded. To solve this problem, an exemplary solution is to vary the location of "middle" for each peer, so that the chunk deletion probability for each peer is also distributed. An example probability function is $$P_i = \frac{E}{\alpha \left| i - \frac{N}{2} + c \right| + \beta}$$

where c is a constant and randomly chosen from [N/2−m, N/2+m], in which m is a configurable value in the range of [0,N/2].

However, these two probability functions have a linear distribution with the highest probability in the "middle" of content. In the alternative, the normal distribution can be used as in the following equation:

$$\varphi_{\mu,\sigma^2}(x) = \frac{1}{\sigma\sqrt{2\pi}} e^{-\frac{(x-\mu)^2}{2\sigma^2}}$$

where σ>0 is the standard deviation, the real parameter μ is the expected value. The deleting probability for a chunk i is thus:

$$P_i = \begin{cases} \int_{i-1}^{i} \varphi_{\mu,\sigma^2}(x) & N \text{ is even} \\ \int_{i-0.5}^{i+0.5} \varphi_{\mu,\sigma^2}(x) & N \text{ is odd} \end{cases}$$

μ, σ² can be chosen randomly for each peer, and μ is in the range of [N/2−m, N/2+m], in which m is a configurable value in the range of [0, N/2].

This approach maintains a balance between the availability of ads and associated content and allows a better use of local storage. If content is being constantly watched, new ads will be downloaded along with those missing chunks. Otherwise, the availability of ads decreases in proportion to the availability of the associated content.

Another approach of synchronizing the availability of ads and associated content is to randomly select certain chunks and make their expiration time the same as their associated ads.

Selecting appropriate ads for the audience is very important in achieving effective advertisement. Without collecting peer information, ads cannot be tailored for each peer.

In the present invention, the correlation between content and ads is explored and ads are associated with their closely related content. This is essentially a classification of ads based on their characteristics so that only people interested in certain content will receive related ads to view. Determining when to render ads during content playback can be done in many ways. One example is to create splice points in the content so that ads will be played when content playback reaches these points. This approach can be context-aware, i.e. adding ads at the most effective locations. Another example is time based, e.g. play an ad every 15 minutes.

In order to improve the matching between ads and content, all content can be tagged with keywords as well as tagging their related ads. Each keyword is also assigned a weight based on their importance in classifying the content or the ad. Ads are dynamically chosen based on the playback behavior of the content. For example, the closed captioning function can be used to match the content keywords tagged with each tagged ad.

However, this classification is coarse-grained. Given the same set of ads for content, different people can view the same ads with a high probability. In order to further target the appropriate audience, for each locally viewed movie (content), a list of viewers' keywords can be kept. When new content is played, the associated ads are ranked (rated) according to the matching between their keywords and the locally saved keywords. The local tags (locally saved keyword) can also be ranked based on their frequency, last update time, etc. By saving (storing) the viewers' keywords locally, users' privacy is further protected.

Whenever content is viewed, the weight of each keyword associated with this content can be incremented by its assigned weight or 1 if no weight is assigned. After K days (or any other appropriate unit of time), the weight of each keyword can be decremented by a constant, for example 1, until the weight reaches 0. K can be manually specified or can be calculated using the frequency of viewing. For example, if a user views content with a frequency of f per day, K=120/f can be used. "120" is an example of the number of total viewings of the content K=120/f is the total days.

The idea here is that the more frequently a user views content, the more quickly this user's viewing behavior (pattern) should be updated. Generally, the value of K should reflect the duration before a user's viewing behavior (pattern) changes.

For each $ad_i$ associated with content, the ads weight is calculated using all of the ads keywords according to the following equation:

$$W_i = \sum_{j=1}^{N_i} w_j$$

where $N_i$ is the number of keywords tagged with $ad_i$, $w_j$ is the weight of keyword j in history keywords. If keyword j does not exist in watching history, $w_j$ is set to 0.

Then all the ads are ranked (rated) according to their weights and the ads with the largest (greatest, highest) weights are chosen.

If it is desirable to give the keywords associated with the content currently being viewed a higher priority, the weight of these keywords can be temporarily increased before calculating weight for each ad.

Another problem is that usually there are multiple people sharing the same peer client. For example, parents and children might share the same TV (or computer or other rendering device) and it may be desirable to target each group. In that event a standard set of keywords is used and classified into several categories. Each keyword has a weight in its category. A keyword might belong to several categories for which it has a weight. Newly identified keywords are added to each category. When content is played, a list of its associated ads is collected. Then, their tagged keywords are matched with the categorized standard set of keywords. Based on the total weight of each ad, the ads are ranked (rated) and the best matching ads are chosen.

Given content, it is first necessary to identify to which category it belongs. The following equation is used to calculate the content's weight in each category:

$$W_c = \sum_{j=1}^{N} w_j$$

where $W_c$ is the weight of this content in category c, N is the number of keywords tagged in this content, $W_j$ is the weight of keyword j in category c. Then the category with the largest (greatest, highest) weight is chosen and it is assumed that the content belongs to the selected category. Then, it is necessary to determine (locate) the closely related ads.

Given an $ad_i$, for the chosen category c, it has a weight $W_{ci}$.

$$W_{ci} = \sum_{j=1}^{N_i} w_j$$

where $N_i$ is the number of keywords tagged with $ad_i$, $w_j$ is the weight of keyword j in category c. If keyword j does not exist in category c, $w_j$ is set to 0.

Then all ads are ranked (rated) according to their weight and those with highest weights are chosen for the content being viewed.

Classification and categorization of these keywords are known and can be done using machine learning techniques, e.g. Bayesian learning.

Although the weights of locally cached keywords are used to classify content and ads, it is very easy to extend to a mechanism that uses a combination of local weights and weights associated with the keywords tagged for a specific content or ad. This way, the keywords tagged with content or ads can have different importance. One way is to use the sum of the weights of content or ads, specific keywords and the keywords' local weights to improve the accuracy of matching.

To further improve the accuracy of matching, keywords and weights can also be assigned to certain locations within the content, e.g. splice points. Therefore, even within the same content, different ads might be chosen based on the current context.

The keyword matching mechanism is just one example of the present invention. It is possible to use various machine learning techniques to further optimize the classification of content and the matching between ads and content.

Figure 1B:
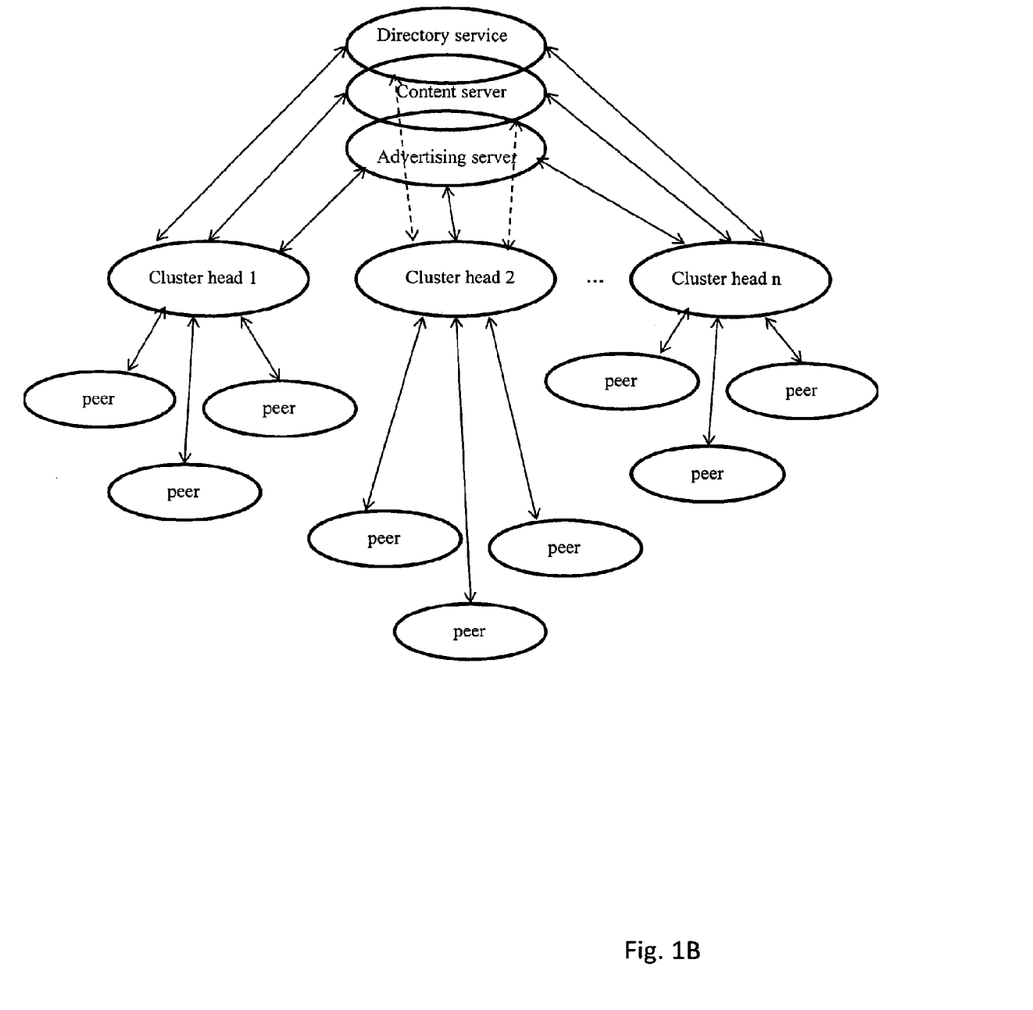
FIG. 1B shows a hierarchically clustered peer-to-peer arrangement.

FIG. 1B shows a hierarchically clustered peer-to-peer arrangement. In this arrangement there are several layers of peers such that the content and ads are downloaded to a cluster head, which has access to a directory service. Other peers access the directory service, content and ads via a cluster head. There may also be a multi-headed hierarchically clustered arrangement (not shown) where a first layer of cluster heads actually has multiple cluster heads. This might be the case where a single cluster head has insufficient bandwidth to service the peers associated with it. There may be a content distribution system with edge servers (not shown) with peers arranged so that the peers receive content and ads from edge servers. In all of the above arrangements, it is possible that one or more of the advertisement server, the content server and the directory service are co-located.

Figure 2:
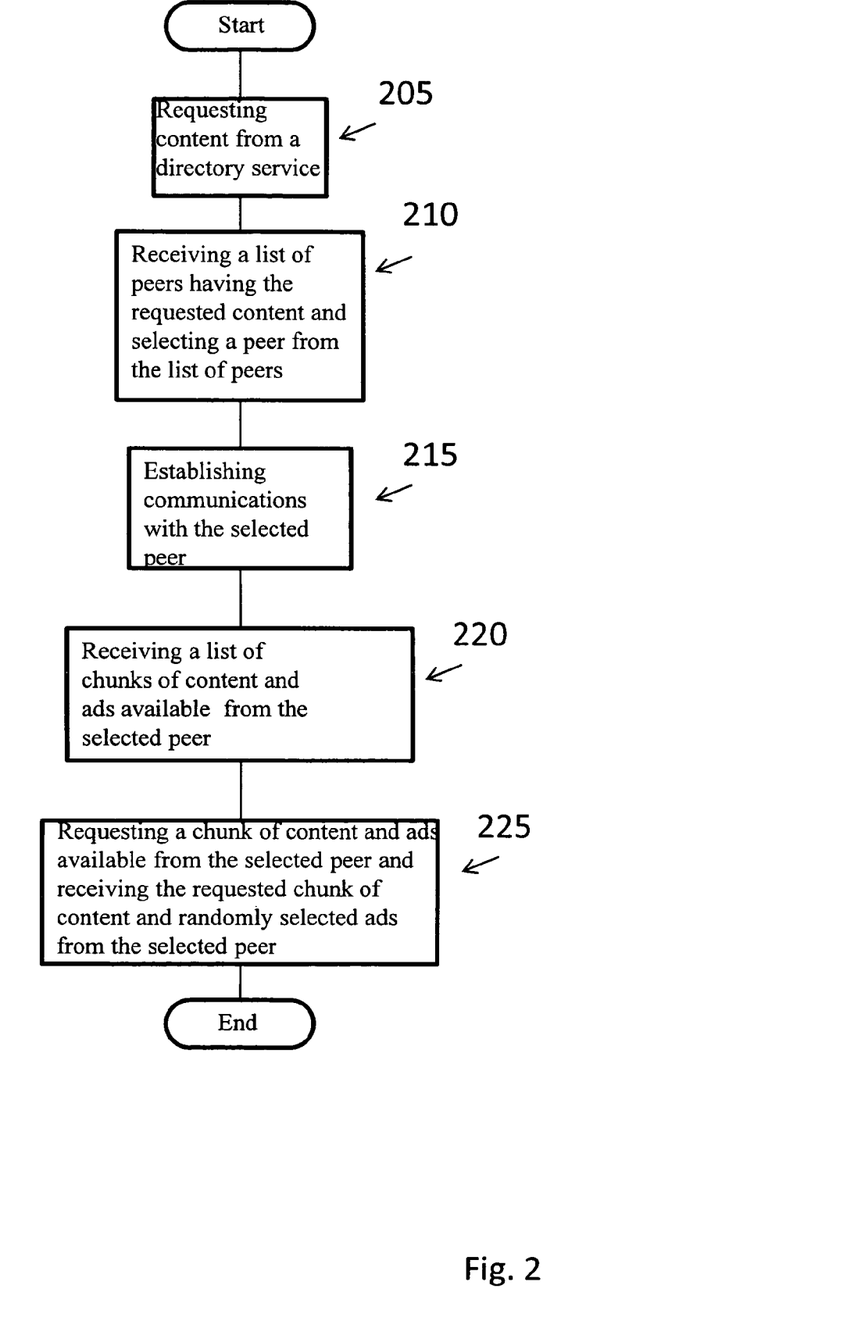
FIG. 2 is a flowchart of an exemplary embodiment of a peer requesting content.

FIG. 2 is a flowchart of an exemplary embodiment of a peer requesting content. At 205, a peer (either a normal peer or a cache-only peer or both types of peers) requests content from a directory service. At 210 the requesting peer receives a list of peers that have the requested content. The requesting peer contacts one or more peers having the requested (needed, desired) content at 215 in order to establish communications with one or more peers on the provided list of peers having the requested content. Peers having the requested content and which are willing and able to provide the requested content are called serving peers herein. The serving peers may be selected by the requesting peer based on a time stamp on the ads in order to ensure that content with the most current (up-to-date) ads is downloaded. At 220 the requesting peer receives a list of available chunks of content and ads from each of the selected serving peers. At 225 the available chunks of content and randomly selected ads are requested from the selected peers and received by the requesting peer from each of the serving peers. The ads are randomly selected by the serving peers. There may, in fact, be duplicate ads because the ads are randomly selected from a number of serving peers.

Figure 3:
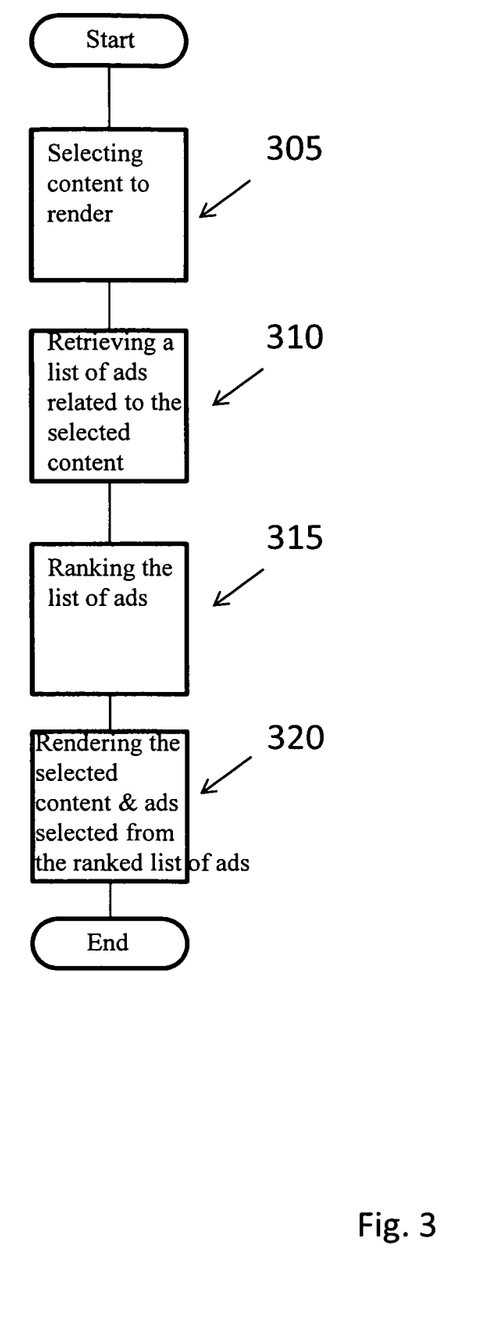
FIG. 3 is a flowchart of an exemplary embodiment of a peer playing (rendering) content.

FIG. 3 is a flowchart of an exemplary embodiment of a peer playing (rendering) content. At 305 a peer (which may have multiple units (chunks) of content stored and available for rendering (playing)) selects the content that is desired to be played (rendered) currently. The stored content and ads were previous received from one or more selected peers (see FIG. 2). The actual act of storing is not shown. At 310 a list of related ads is retrieved from local storage.

At 315 the list of ads is ranked (rated). Keywords are tagged to make the ads targetable to a local peer. The associated ads are ranked (rated) according to the matching between their keywords and the locally saved keywords (viewer keywords). The local tags (locally saved keywords) can also be ranked based on their frequency, last update time, etc. Then all the ads are ranked (rated) according to their weights and the ads with the largest (greatest, highest) total weights are chosen. When content is played, a list of its associated ads is collected. Then, their tagged keywords for both the content and the ads are matched with the categorized standard set of keywords. In order to improve the matching between ads and content, all content can be tagged with keywords as well as tagging their related ads. Each keyword is also assigned a weight based on their importance in classifying the content or the ad. Ads are dynamically chosen based on the playback behavior of the content. For example, the closed captioning function can be used to match the content keywords tagged with each tagged ad. Although the weights of locally cached keywords (viewer keywords) are used to classify content and ads, it is very easy to extend to a mechanism that uses a combination of local weights and weights associated with the keywords tagged for a specific content or ad. This way, the keywords tagged with content or ads can have different importance. One way is to use the sum of the weights of content or ads specific keywords and the keywords' local weights to improve the accuracy of matching. To further improve the accuracy of matching, keywords and weights can also be assigned to certain locations within the content, e.g. splice points. Therefore, even within the same content, different ads might be chosen based on the current context. Matching of keywords between ads and contents is used for distributing them together (piggyback, no need for a separate mechanism for ad distribution). Matching of keywords between ads and viewer keywords is for targeting. Viewer keywords represent user's interests. They are collected based on what content the user has watched.) At 320, the selected content is rendered (played) while periodically playing (rendering) the selected ads from the ranked list of ads.

Figure 4:
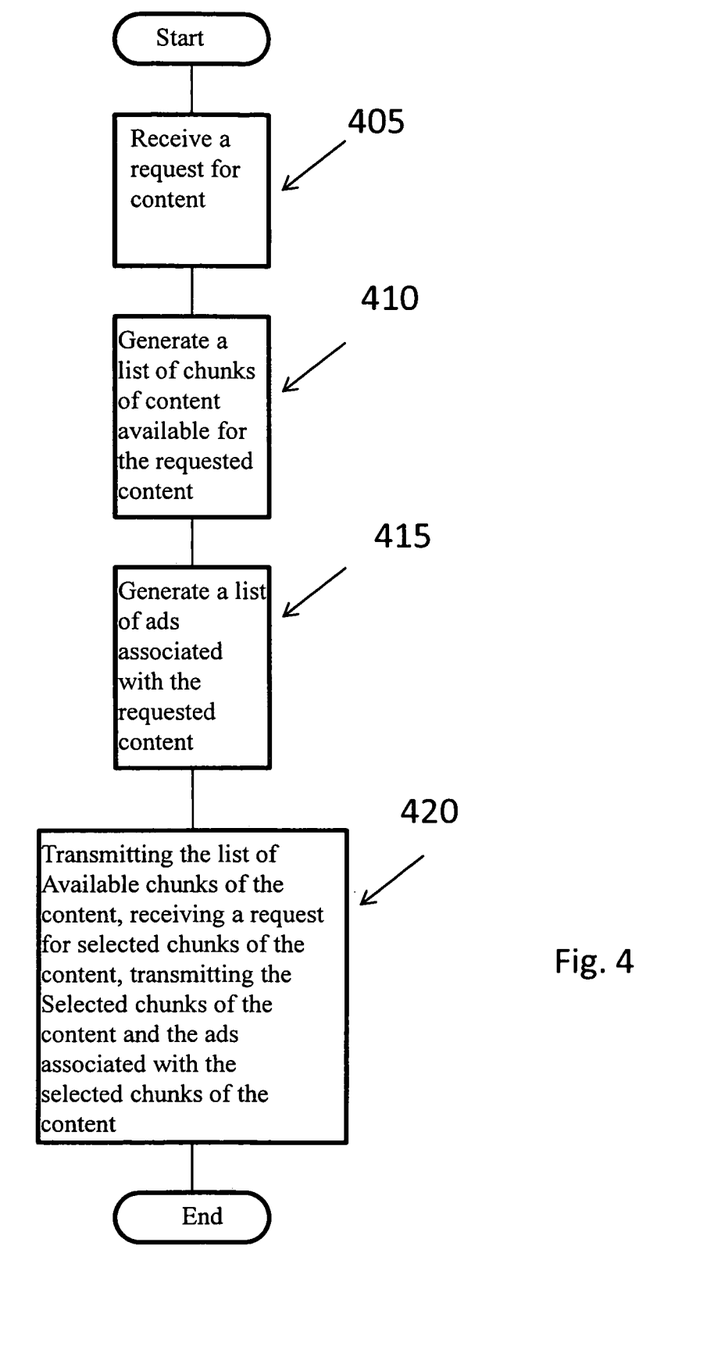
FIG. 4 is a flowchart of an exemplary embodiment of a peer serving content to another peer.

FIG. 4 is a flowchart of an exemplary embodiment of a peer serving content to another peer. It is assumed at this point that communications have been established between the requesting peer and the serving peer, the requesting peer having received a list of peers having the content that the requesting peer desires or needs from the directory service. The requesting peer initiates establishment of communications with the serving peers selected form the list of serving peers provided by the directory service. At 405 the serving peer receives a request for content from a requesting peer with which communications have been established. At 410 the serving peers generate (determine) a list of available chunks of the requested content. At 415, the serving peers randomly generate (determine) a list of ads from a list of ads associated with the requested content. At 420, the serving peer, returns (transmits) the list of content and the randomly selected ads to the requesting peers. There is no ranking performed here because the serving peer does not know anything about who is requesting content (and correspondingly ads). The requesting peer's further request for specific chunks of the content from the list supplied at 420 and the serving peer then transmits the requested chunks of content and associated ads is implied by box 420 including a return of the list of content chunks and ads.

Figure 5:
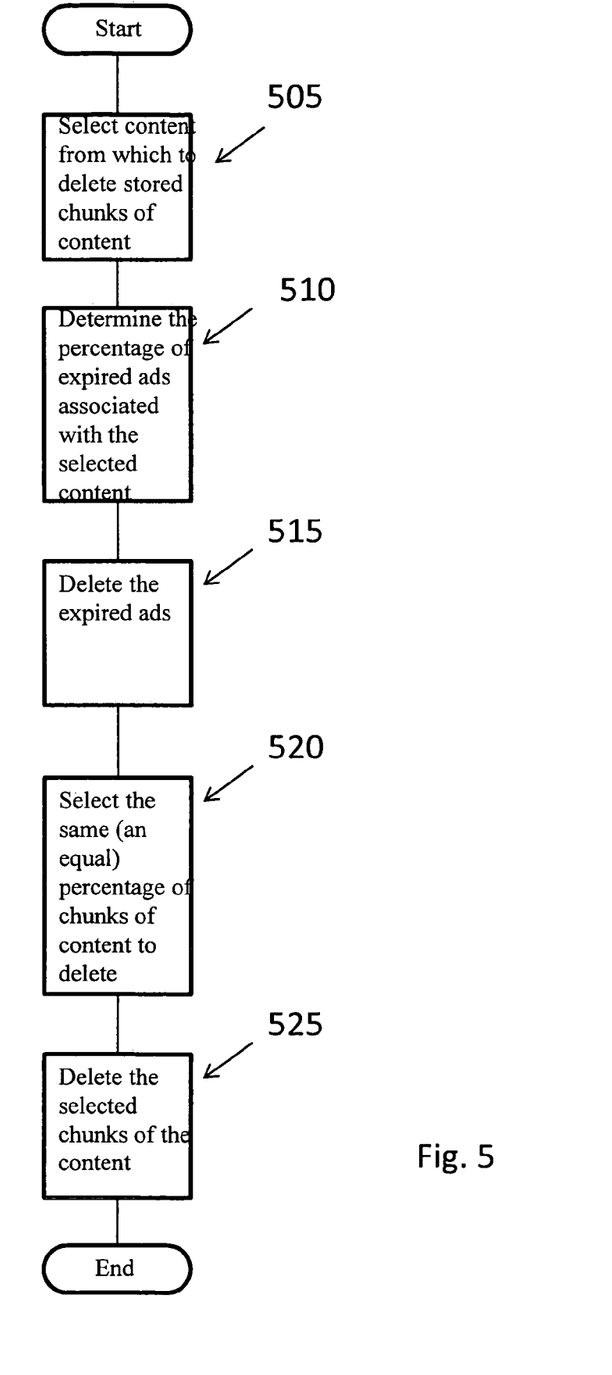
FIG. 5 is a flowchart of an exemplary embodiment of a peer deleting ads and chunks of the associated content.

FIG. 5 is a flowchart of an exemplary embodiment of a peer (a normal peer, a cache-only peer or both peers) deleting ads and chunks of the associated content. At 505 the peer selects content from which to delete stored chunks. At 510, the percentage of expired ads (based on a time stamp, for example) is determined (calculated). At 515, the expired ads are deleted. At 520 the peer selects the same percentage of chunks of content as the calculated percentage of expired ads. The selection of the chunks of content was described above and is generally out of the middle of the available content. At 525 the selected chunks of content are deleted.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for targeting advertising to a receiving peer device, said method comprising:

requesting content from a directory service, the request performed by said receiving peer device on a peer-to-peer network;

receiving a list of peers in the peer-to-peer network having said requested content;

selecting a serving peer from said received list of peers;

establishing communications with said selected serving peer;

receiving a list of chunks of content and associated ads available from said selected serving peer;

requesting a chunk of content and associated ads available from said selected serving peer, said associated ads are associated with said chunk of content; and receiving said requested chunk of content and randomly selected associated ads from said selected serving peers;

storing said received chunk of content and said randomly selected ads;

ranking said received ads by said receiving peer device, wherein highly ranked ads are chosen for rendering;

selecting content from which stored chunks of content are to be deleted;

determining a percentage of expired ads associated with said selected content;

deleting said expired ads;

selecting an equal percentage of said stored chunks of content as the percentage of expired ads to delete; and deleting said selected chunks of content.

2. The method according to claim 1, wherein the selected peer is randomly selected from said list of peers.

3. The method according to claim 1, wherein said received chunk of content and said randomly selected ads are one of downloaded and streamed.

4. The method according to claim 1, wherein ranking ads from the randomly selected associated ads further comprises:

selecting content to render;

retrieving a list of ads related to said selected content;

ranking said list of ads; and rendering said content and ads selected from said ranked list of ads responsive to said ranking.

5. The method according to claim 4, wherein each ad is associated with a set of keywords and wherein each ad keyword has an associated weight and further wherein said ranking is responsive to a matching between viewer keywords and said ad keywords.

6. The method according to claim 5, wherein said ranking is accomplished using a combination of said associated weights of said ad keywords.

7. The method according to claim 6, wherein said combination is a sum of said associated weights of said ad keywords.

8. The method according to claim 1, wherein said equal percentage is based on a normal distribution function.

* * * * *